United States Patent [19]
Wittstein et al.

[11] Patent Number: 5,631,947
[45] Date of Patent: May 20, 1997

[54] MOBILE TELEPHONE DEVICE FOR STORING A PLURALITY OF CHANGABLE CHARGE RATES AND TIME LIMIT DATA

[75] Inventors: Alan D. Wittstein, Westport; Giacomo A. Ciocca, Thomaston, both of Conn.

[73] Assignee: Megatrend Telecommunications, Inc., Bridgeport, Conn.

[21] Appl. No.: 373,509

[22] Filed: Jan. 17, 1995

Related U.S. Application Data

[63] Continuation of Ser. No. 235,198, Apr. 29, 1994, abandoned, which is a continuation of Ser. No. 673,140, Mar. 4, 1991, abandoned.

[51] Int. Cl.$^6$ ............... H04Q 7/20; H04Q 7/22; H04Q 7/24
[52] U.S. Cl. ............... 379/59; 379/112; 379/114; 379/63; 379/58
[58] Field of Search ............... 379/58, 59, 61, 379/62, 63, 112, 114

[56] References Cited

U.S. PATENT DOCUMENTS

| | | | |
|---|---|---|---|
| 3,581,019 | 5/1971 | Ryan | 379/63 |
| 4,118,687 | 10/1978 | McWalew et al. | 382/59 |
| 4,724,537 | 2/1988 | Maret | 379/58 |
| 4,731,818 | 3/1988 | Clark, Jr. et al. | 379/144 |
| 4,776,000 | 10/1988 | Parierti | 379/62 |
| 4,776,003 | 10/1988 | Harris | 379/91 |
| 4,777,646 | 10/1988 | Harris | 379/91 |
| 4,813,065 | 3/1989 | Segala | 379/112 |
| 4,831,647 | 5/1989 | D'Avello et al. | 379/91 |
| 4,845,740 | 7/1989 | Tokuyama et al. | 379/91 |
| 4,860,336 | 8/1989 | D'Avello et al. | 379/63 |
| 4,860,341 | 8/1989 | D'Avello et al. | 379/91 |
| 4,868,846 | 9/1989 | Kemppi | 379/144 |
| 4,920,562 | 4/1990 | Hird et al. | 379/132 |
| 4,935,956 | 6/1990 | Hellwarth et al. | 379/112 |
| 4,951,308 | 8/1990 | Bishop et al. | 379/91 |
| 4,965,821 | 10/1990 | Bishop et al. | 379/91 |
| 4,975,942 | 12/1990 | Zebryk | 379/144 |
| 4,992,517 | 2/1991 | West, Jr. et al. | 379/58 |
| 5,046,085 | 9/1991 | Godsey et al. | 379/112 |
| 5,109,401 | 4/1992 | Hattori et al. | 379/58 |
| 5,127,041 | 6/1992 | O'Sullivan | 379/59 |
| 5,134,651 | 7/1992 | Ortiz et al. | 379/112 |
| 5,138,650 | 8/1992 | Stahl et al. | 379/61 |
| 5,144,649 | 9/1992 | Zicker et al. | 379/59 |
| 5,233,642 | 8/1993 | Renton | 379/59 |

FOREIGN PATENT DOCUMENTS

| | | | |
|---|---|---|---|
| 0160149 | 12/1981 | Japan | 378/143 |
| 2016078 | 9/1992 | WIPO | 379/58 |

OTHER PUBLICATIONS

Mitel Applications Note MSAN120 MT 8880 ETMF Transceiver Applications, Jun. 1986.

Primary Examiner—William Cumming
Attorney, Agent, or Firm—Curtis, Morris & Safford, P.C.; Gregor N. Neff, Esq.

[57] ABSTRACT

The mobile telephone is well adapted for use as a rental phone. It has an on-board computer which computes and stores telephone usage and control information such as charges for usage of the telephone. Time and charge limits can be set for the telephone. For example, the telephone can be set to disable itself for all or a selected category of incoming and outgoing calls after the passage of a pre-determined time, and/or when the total usage charges reach a pre-determined maximum. Preferably, these limits can be set and adjusted remotely. The telephone is valuable for use in rental vehicles. The telephone is adapted to deliver its stored information when called and interrogated by use of a computer at a station when the rental vehicle is returned. The telephone can be checked-out and enabled, and the time and charge limits adjusted, all from the same remote station. The telephone also is particularly valuable in other types of rentals, such as in a hotel or motel where the mobile telephone is housed in a portable briefcase or carrying case. The time and charge limits are enforced automatically, and can be changed remotely, as with other versions of the telephone device. Features also are provided to block unwanted calls intended for a prior renter of the phone; to give charge credits for "dropped calls"; and for selectively locking the phone to prevent unauthorized use for all but emergency calls, data transmission and similar calls.

23 Claims, 6 Drawing Sheets

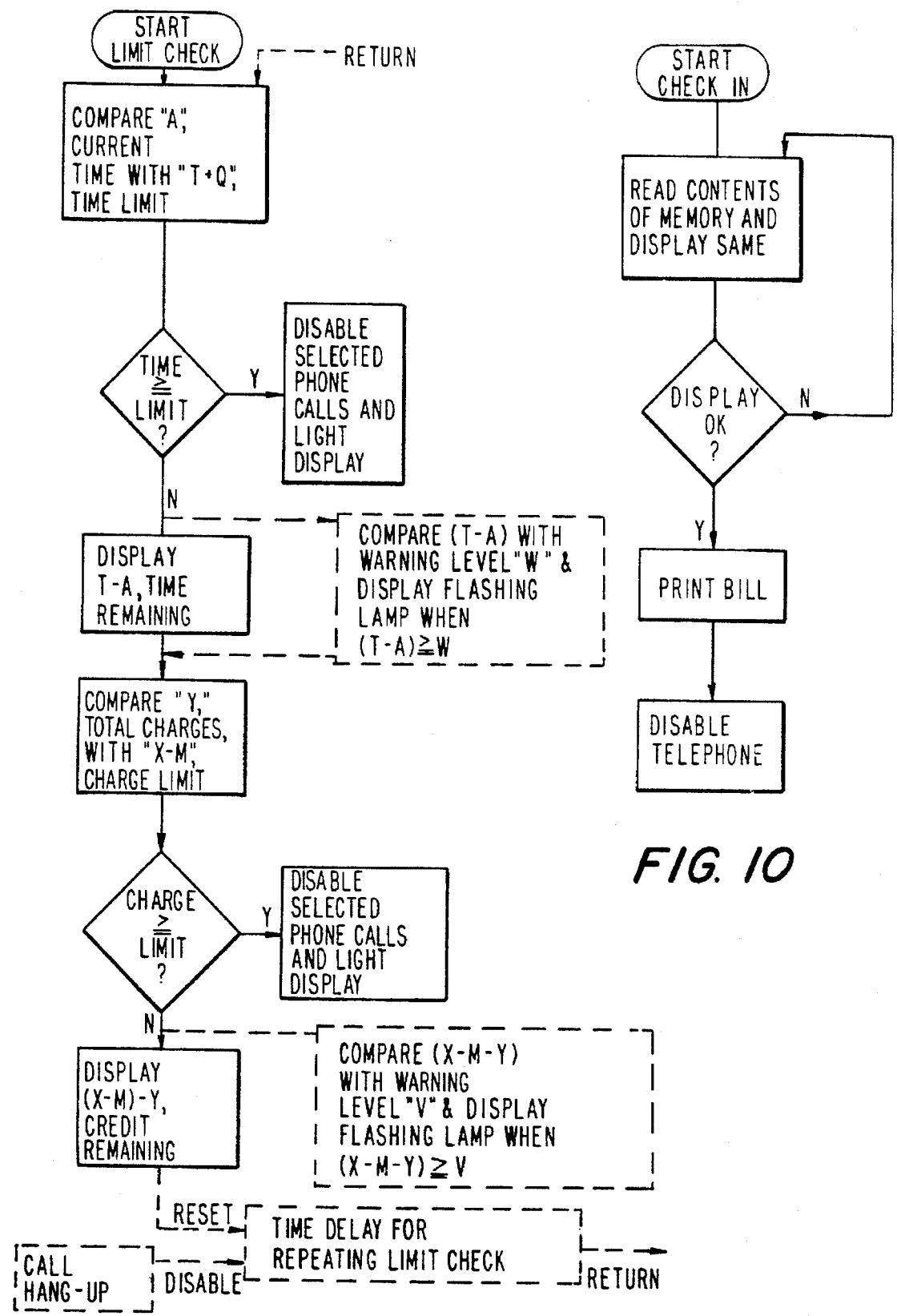

MOBILE TELEPHONE DEVICE FOR STORING A PLURALITY OF CHANGABLE CHARGE RATES AND TIME LIMIT DATA

This application is a continuation of application Ser. No. 80/235,198, filed on Apr. 29, 1994 now abandoned, which is a continuation of Ser. No. 07/673,140 filed on Mar. 4, 1991 now abandoned.

BACKGROUND OF THE INVENTION

This invention relates to mobile telephones and methods of using and renting them, and particularly to mobile telephones, systems and methods for use in rental vehicles, such as rental cars and trucks, taxis, limousines, golf carts, boats and aircraft, and in other rentals such as in hotels, motels, restaurants, catering halls, convention centers, etc.

One of the problems in renting mobile telephones lies in the risk involved with allowing the rental customer to make calls without any limits as to time or charges. Thus, even though the customer uses a valid credit card to which to charge the cost of the rental, and even though the renting company may obtain authorization for a specific amount of charges from the credit card company before the rental is made, there is nothing to prevent the customer from incurring charges exceeding that amount. The result may be that the excess charges never are paid. A similar problem exists with enforcing time limits agreed to by the customer when renting the phone.

The foregoing problem is complicated by the fact that the telephone lessor usually would like to allow customers to use the telephone beyond the pre-determined credit or time limits, as long as he or she has sufficient credit to pay for the extra use.

One prior mobile telephone rental approach used with rental vehicles is to provide a credit card reader with the telephone in the vehicle. The user usually must insert his or her credit card into the reader in order to use the phone. This has several disadvantages. First, the card reader is expensive and takes up a considerable amount of space. Secondly, the need to insert a credit card is cumbersome and can be dangerous, if it is the driver of the vehicle who is using the phone. Also, in most such devices, although verification of the credit card is performed, authorization of an amount of credit is not. Thus, even though the call is charged to a valid card, there is no assurance that the holder has not exceeded the limit of charges on his card. Thus, there is a significant chance that the rental company will not be paid for the call.

Billing for the call is computed at a central station, and a bill usually is sent to the rental company or customers only relatively infrequently. Thus, the user usually does not know the amount of the charges for some time and cannot get reimbursement for the costs from his employer or client until well after the event.

An additional problem is that mounting the card reader often requires holes to be cut in the interior of the car. This is highly undesirable for rental cars because the holes reduce the value of the cars after the phones are removed.

In another prior system, portable cellular telephones are rented by the customer, carried out to the car, and carried back to the rental station when returned. The rental usually is arranged at a counter separate from the vehicle rental counter, and a separate bill and credit card verification are required.

This prior system is cumbersome, labor-intensive, slow and inconvenient for both the customer and the rental company. Moreover, the telephones are not firmly secured in the vehicle and thus can be dropped and mishandled by the customer or easily stolen by thieves. Further, the loose telephones are relatively clumsy to use, and thus may reduce the safety of operation of the vehicle if the driver of the vehicle uses the phone while driving.

In neither of the foregoing systems does the telephone compute and store rental charges for the phone. This means that billing must be computed elsewhere, with extra delays.

Another prior system, sold under the trademark "AUTOMATE" by Megatrend Telecommunications of Thomaston, Conn., uses an on-board microcomputer to compute the charges for the phone usage and, has an integral printer. The charges and other call details are not stored but are printed as the calls are being made. In limousines and taxis, etc., the printed call detail record is readily accessible to the driver, who can present the bill to the customer on the spot, and get paid for the calls then or later.

Similar systems are sold by Megatrend Telecommunications under the marks "TABLEMATE" and "FIRSTMATE" for use in restaurants and boats, respectively.

In rental cars, the customers are not given access to the printer. The printer typically is locked in a case kept in the trunk of the car. When the car is returned, an employee unlocks the case and removes the printed strip bearing the call data and charges, and turns it into the rental desk where a corresponding bill is prepared. The telephone is mounted securely in the car.

The Automate system has several advantages over the other prior systems described above. For example, the phones are mounted securely in the cars and need not be moved during either rental or return. Bills can be prepared and given to the customers faster. Credit card readers are not required. However, the system requires that an employee manually fetch the phone usage print-out and turn it into the rental desk. If the employee forgets or otherwise fails to do this, the customer is not charged for the use of the phone, and the rental company loses revenues. Furthermore, installation of the device in the cars can be relatively difficult and expensive, in that an electric cable is used to connect the telephone and computer in the front seat area of the car to the printer in the trunk. Of course, the printer adds cost to the system. The need to keep the printer locked up and located in the trunk of the car slows the retrieval of the printed tickets and, therefore, adds labor cost to the process.

Other general systems for mobile telephone rentals have been proposed but are not known to have been used commercially to any significant extent.

In hotels, motels, convention centers, and similar temporary locations for businesses and people, there is a need for mobile telephone rentals.

Often, the hotel or motel guest needs a mobile telephone for use on business and meetings conducted outside the hotel or motel, or in rooms within the hotel whose telephone service is inadequate. Again, as with the rental of mobile phones in rental vehicles, there is a need for quickly and easily determining call details and charges to be added to the guest's hotel bill when he or she checks out. Otherwise, there might well be a serious delay in the billings for such rentals, with a concomitant loss of earnings and/or unhappiness of customers. Other problems with and deterrents to such rentals are the risk and other factors mentioned above.

Some prior cellular mobile telephones have "transceiver locks", by means of which the mobile telephone transceiver is disabled entirely when a certain combination of keys is pressed by the user, thus preventing unwanted use while the owner or renter is away from the phone. This system does not always work when an interface is added to enable the use of an ordinary telephone with the cellular phone.

In rental telephones, another problem is that calls directed to the prior renter of the phone can be a nuisance to the new renter of the phone. Also, because charges are made for incoming calls as well as outgoing calls, they can cause the new renter expense and dissatisfaction.

"Dropped calls" are a special problem in mobile telephones. When a call connection is broken by system interference, one of the parties must re-make the call, and the party being charged for the call expects credit for the last minute of the call. Providing this credit to the customer is a problem, especially in a mobile telephone with an interface permitting the use of an ordinary telephone.

SUMMARY OF THE INVENTION

In accordance with the foregoing, it is an object of the invention to provide a telephone, system and method, and particularly a mobile telephone, system and method which overcomes or alleviates the foregoing problems.

It is a further object to provide a mobile telephone, system and method in which monetary risks due to excessive use of the telephone by the user are minimized.

In particular, it is an object to provide a mobile telephone, system and method in which the telephone device in the car can be checked out and checked in with the rental vehicle in which it is mounted, without the need for a card reader or printer in the car, or for making any modifications to the car which will lower its value, and without the need to carry the telephone device to or from the rental vehicle.

It is a further object to provide such a device, system and method which can be controlled to read out the call charge data, enable, disable and adjust time or charge limits for the telephone device, all without human manipulation of the mobile telephone device.

It is another object to provide a mobile telephone device which computes and stores all detail records and charges and remotely or locally reads out that information for billing purposes.

It is another object to provide a mobile telephone device having some or all of the foregoing beneficial characteristics, and which is portable. In particular, it is desired to provide such a portable rental unit which is easy to check in and out at hotels and motels, convention centers, or other telephone rental stations.

It is a further object of the invention to provide such a telephone and system which are relatively small in size, economical to make and install, and reliable in use.

The foregoing objects are met, in accordance with the present invention, by the provision of a mobile telephone, device and method in which limits on the usage of the telephone can be set and enforced automatically and/or remotely. Preferably, the telephone device can be set to automatically disable the for making and receiving telephone all calls or selected calls, when a pre-determined charge limit and/or time limit has been reached. Preferably, the charge limit is that which has been authorized to be charged against the rental customer's credit card, and the time limit is the time limit for the rental agreed to at the time of rental.

The invention also fulfills the objects set forth above by providing a mobile telephone device which stores telephone usage data and delivers corresponding data signals in response to interrogation at a rental station. Preferably, the telephone device includes a microprocessor programmed to compute charges for the use of the telephone.

Also, it is preferred that when the usage limit of the mobile telephone has expired, the telephone is still enabled to place free emergency assistance calls to law enforcement and medical service organizations, and to the rental company for vehicle repairs, or for increasing usage limits for the telephone. Also, free calls to selected numbers for promotional purposes, or for other desired purposes, can be permitted at all times, regardless of the expiration of any time or charge limits.

The invention also provides a mobile telephone rental system and method in which such mobile telephone devices are mounted in rental vehicles, with control means at the rental station for retrieving the telephone usage data from the telephone devices. Preferably, this is done remotely by use of the same terminal equipment used in the rental of cars.

Preferably, the vehicle rental computer terminals and printers normally used to prepare vehicle rental contracts are provided with modems and software enabling them to be used to dial the telephone in a given vehicle, whether or not it is in use, and read data, enable or disable the telephone, set the time and charge limits and perform all control operations for the telephone, as well as adding telephone rental charges to the usual car rental bill.

Alternatively, telephone control software can be stored in the disk file of the terminal or an auxiliary disk file and accessed to enable the terminal to perform the telephone control functions. In another alternative, a stand-alone dedicated auxiliary modem, computer terminal and printer can be provided for the same purpose. Another alternative embodiment uses a modem and micro-computer mounted on an expansion card and inserted in an expansion slot of the terminal to be accessed and used for telephone function control. In these alternative embodiments, it may be preferable to print a telephone bill which is separate from the car rental bill and to use a dedicated printer for the purpose.

A "valet lock" feature also is provided to permit the telephone renter to partially disable the telephone when he or she turns the vehicle over to a stranger who is to park the vehicle, repair it, or otherwise use the vehicle without the presence of the renter. The phone is selectively "locked" by programming its computer so that it remains usable for emergency calls and data transfers, and, if desired, for other free calls. The locking code can be changed readily, and easily can be made random and different for each mobile unit rented by a given rental company, thus increasing the security of the lock system.

In another embodiment of the invention, the mobile telephone devices are manually interrogated to obtain call detail information upon return of the rental equipment to a rental station, without including a printer in the telephone device. For example, the call detail data is stored in memory in the telephone device. Then, when the device is returned, an output device such as a printer or electronic data transfer device is plugged into the mobile unit to read out the desired data. The data then is used to prepare a bill or receipt to the customer.

In rental vehicles, the telephone device can be located conveniently in the front seat area, fully accessible to the customer and to a rental company attendant who can retrieve the data by simply plugging a hand-held portable printer or electronic data storage device into the telephone, retrieving the data, and carrying it to the rental station for use in preparing a bill. It is not necessary to unlock the trunk and a case in the trunk to get access to a printer, and it is not necessary to supply a printer with the telephone device.

In portable telephone devices, preferably rented in carrying cases, the data can be retrieved remotely or by a hand-held retrieval device, but it is preferred that data retrieval be done by plugging a cable into a port on the telephone device and conducting that data to a computer. In a hotel or motel, that computer preferably would be one used by the establishment for normal guest check-in and check-out functions. Thus, the charges easily can be added to the guest's hotel or motel bill.

An incoming call protection feature protects against unwanted calls directed to the phone by callers using the phone number of a prior phone renter by using the phone's computer to recognize the call only if it contains an added digit.

The digit is easily changed to make the phone number for a new renter different from the number for the prior renter. Preferably, the number indexes automatically with each new rental.

Credit for the last minute's charge for "dropped calls" is provided by detecting whether either party hangs up prior to breaking of the connection. If a hang-up occurs, it is determined to be a completed call, and no credit is given. If it does not occur, the call is counted as a dropped call, and the credit is given.

Other objects, advantages and features of the invention will be set forth in or will be apparent from the following description and drawings.

BRIEF DESCRIPTION OF THE DRAWING

FIGS. 7 through 10 are flow charts illustrating computer program used in the present invention.

DESCRIPTION OF THE PREFERRED EMBODIMENTS

Figure 1:
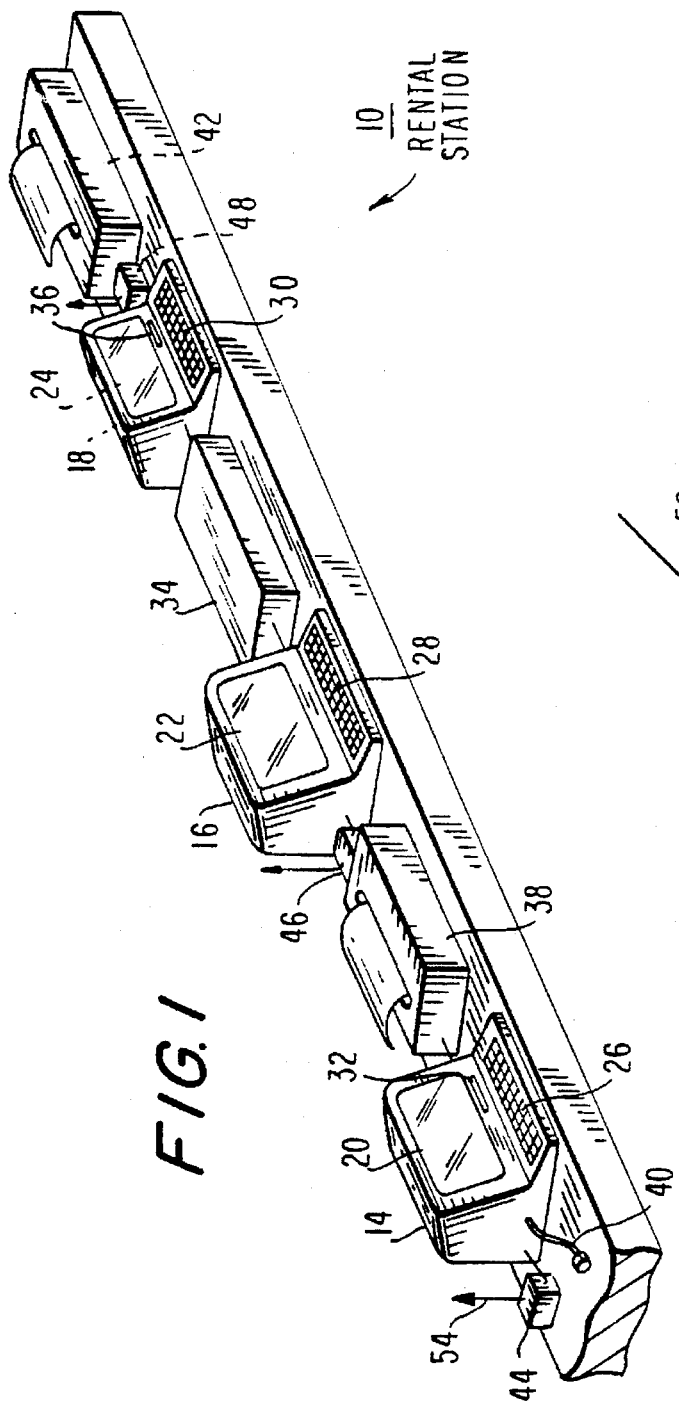
FIGS. 1 and 1A are broken-away perspective views of, respectively, typical vehicle rental station and remote vehicle containing a mobile telephone device, and illustrate a mobile telephone rental system constructed in accordance with the present invention.
Figure 2:
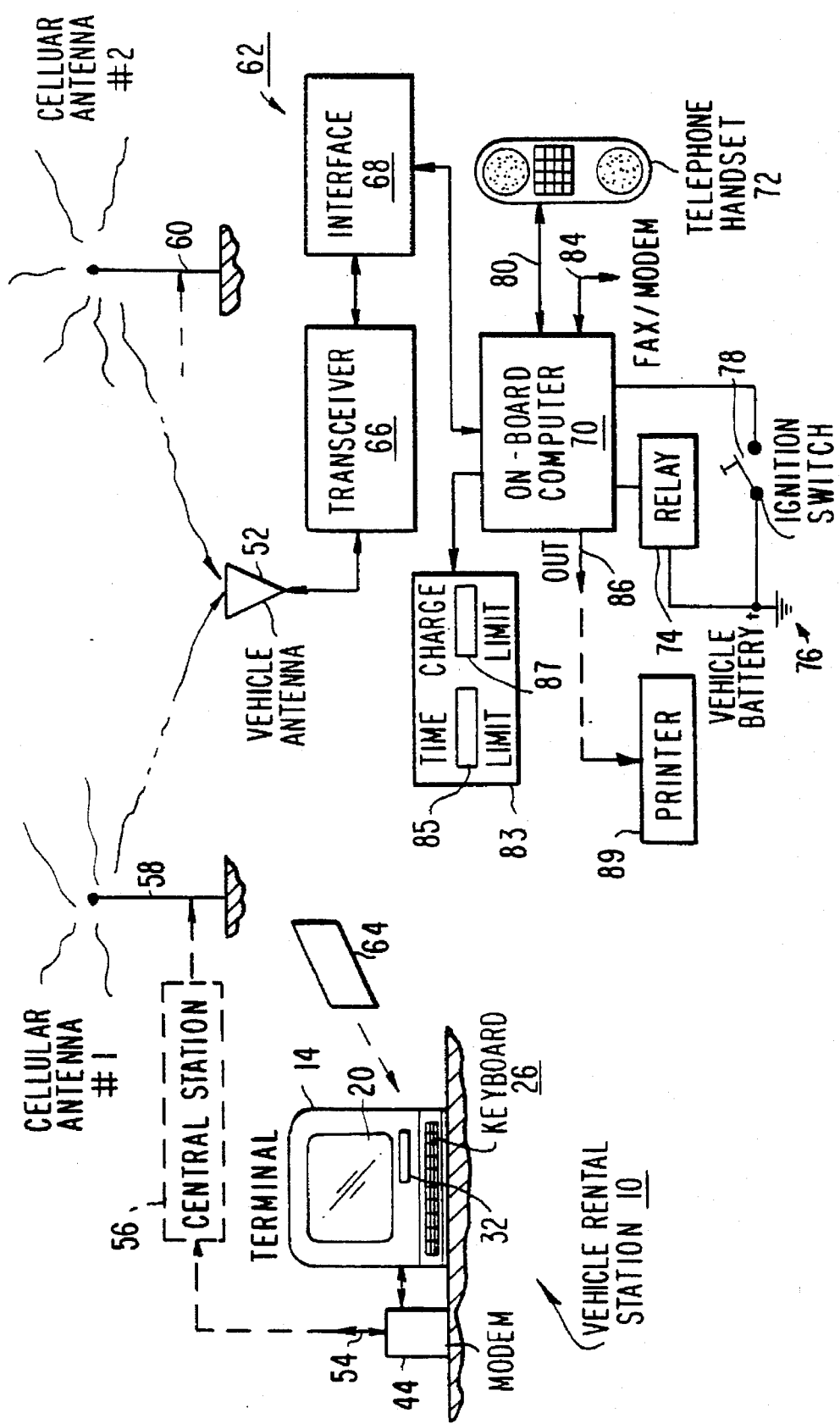
FIG. 2 is a schematic diagram showing other features of the system of the mobile telephone of FIG. 1.

A vehicle rental station or desk 10 is shown in FIGS. 1 and 2. At the rental station 10 there are two conventional computer terminals 14 and 16 such as those which are used at automobile rental stations in airports or other locations. Each of the terminals 14 and 16 includes a keyboard 26 or 28, and a screen, 20 or 22. Each terminal is connected to a printer 38 which prints vehicle rental agreements for customers.

The two terminals 14 and 16 illustrate two different kinds of terminals which are typically used. The terminal 14 has a internal disk drive indicated at 32 for accepting programs. The terminal 16 is a work station for a local area network which has an external file server 34. The file server 34 has disk storage which is shared with other terminals. A data transfer cable 40 is provided to connect to data storage devices to transfer data into the terminal 14, in one of the alternative embodiments of the invention to be described below.

Figure 1A:
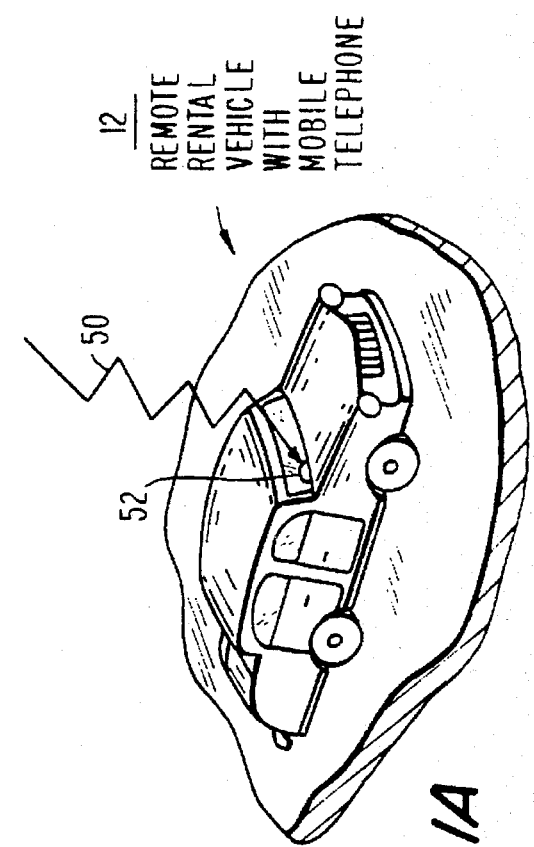

FIG. 1A shows a rental vehicle 12 which is located remotely from the vehicle rental station 10. It has an antenna 52 of the variety mounted on the windshield of the automobile, and communications are received and transmitted by means of the antenna as part of a mobile telephone device mounted in the vehicle.

Referring now to FIG. 2, in accordance with one feature of the present invention, the mobile telephone device 62 mounted in the vehicle includes an on-board computer 70 which computes charges made for the use of the telephone based on charge rates stored in its storage means and stores that information as well as other call usage information, such as the other data normally included in a Call Detail Record.

The mobile telephone rental system shown in FIGS. 1 and 2 is adapted to remotely enable the mobile telephone device 62 mounted in a rental vehicle when it is being rented by a customer. It also is adapted to remotely interrogate the telephone device 62 upon return of the vehicle by the customer, and retrieve the data stored in the on-board computer 70 for use in preparing a bill to the customer for use and rental of the telephone.

Preferably, this is done by use of one of the terminals 14 or 16 or an optional terminal 18 at the rental station, through the telephone lines and a cellular telephone system, and one of the modems 44, 46 or 48 connected to the terminals. It should be understood that the modems usually will be mounted inside the terminal housings. The telephone usage information then is utilized at the terminal to prepare a bill to the customer, by using the printer 38, or by using another printer 42, which is dedicated solely to preparing telephone rental bills.

It is preferred that the rental company's computer system which is used to prepare rental contracts is programmed so that the telephone rental charges are included on the normal vehicle rental contract. Thus, the equipment and forms already used by the vehicle rental company also can be used to rent and control the mobile telephones, with relatively few modifications or additions.

Alternatively, it is possible to avoid programming the computer system of the rental car company by providing a separate stand-alone personal computer 18 with a modem 48 and a separate printer 42 to provide a bill for the telephone rental information and control. This adds some hardware cost, but provides an easily usable rental system when full reprogramming of the car rental system is not warranted.

The mobile telephone device 62 (FIG. 2) also is provided with the capability of being disabled selectively when certain usage limits have been met during a rental. For example, in accordance with one aspect of the invention, the system shown in FIGS. 1 and 2 is provided with means for setting time and/or monetary limits on the usage of the telephone by the customer. By operating the keyboard 26, 28 or 30 of one of the terminals, the operator can enter monetary limits for the usage of the telephone. Preferably, these limits will be equal to a predetermined authorization amount reserved with the credit card company for the credit card of the customer at the time of the rental. The mobile telephone device 62 includes means for selectively disabling the use of the telephone device to make or receive most or all calls when the dollar amount has been reached.

Similarly, the rental agent can set a limit on the time during which the telephone can be used. For example, the time limit can be set at the scheduled return time for the vehicle, plus a certain amount of permitted overtime. The telephone is automatically disabled for making or receiving most or all calls when that time expires.

In FIG. 2 of the drawings, the vehicle rental system is illustrated by showing only one of the terminals shown in FIG. 1, the terminal 14 with its modem 44. Also shown is a telephone line linkage 54 which is linked through normal telephone connections to a telephone central station 56, through a cellular network (not shown) and cellular telephone antenna 58 or 60 to the mobile telephone device 62 on-board the vehicle 12.

In its preferred embodiment, the telephone device is a cellular telephone device, but this is not essential to the invention. For example, the invention is usable with "PCN" or "CT/2" mobile telephone technology, as well as other mobile telephone technology. As it is well known, in a cellular telephone system, as the automobile travels from the area covered by one of the antennas 58 into the area or "cell" of the next antenna 60, the communications link is automatically switched from one of the antennas to the other.

MOBILE TELEPHONE DEVICE

The mobile telephone device 62 in the vehicle includes the antenna 52 which is connected to a conventional cellular transceiver 66. The transceiver 66 is connected to an interface device 68, of known construction which is used to convert the signals to and from the transceiver 66 into ordinary telephone signals. The interface device provides, for example, an ordinary dial tone, etc. as is well known. This permits the use of ordinary telephone devices in the vehicle.

Connected to the interface 68 is the on-board computer 70.

Figure 4:
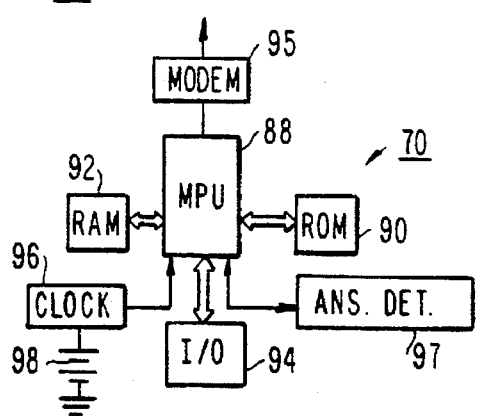
FIG. 4 is a block diagram of the on-board computer of the mobile telephone of the invention.

The on-board computer 70 is shown in some detail in FIG. 4. The computer 70 includes a microprocessor 88, a read-only memory (ROM) 90, random access memory (RAM) 92, input/output circuitry 94, and a clock circuit 96 powered by a lithium battery 98. The random access memory is used to store call detail record data, to compute charges for usage of the telephone device by the customer, and for other conventional purposes. A known answer detection device 97 is provided so as to charge the customer only for calls which are actually completed.

Referring again to FIG. 2, the mobile telephone device 62 also includes a telephone hand-set 72 and a key pad 82 for dialing and other normal telephone functions. Preferably, the hand-set 72 also has speed-dialing keys so that the user can dial commonly-called numbers simply by pressing one button. The telephone device also preferably has a "speaker" phone so that the user can talk on the telephone while using both hands to drive the vehicle.

The telephone device 62, when mounted in a vehicle, has a display panel 83 exposed to the view of the telephone user. The display panel 83 has LED indicator lamps 85 and 87 which indicate, respectively, when the time limit or charge limit of the telephone has been reached. If preferred, the displays can show the amount of time or credit left.

Alternatively, the limit indication can be given by audible tones or synthesized voice warnings through the telephone or other speaker. These features will be described in greater detail below.

As it is indicated in FIG. 2, the telephone device is powered by the vehicle battery 76, except that the clock 96 has its own battery 98. Power is applied by closing the ignition switch 78 on the automobile. After the ignition switch is turned off, a time-delay relay 74 maintains the connection of the telephone device to the vehicle battery for a pre-determined length of time, e.g., one to eight hours or so, to ensure that the telephone device remains energized for a desired length of time after the vehicle has been returned to the rental station so that it can be interrogated for call detail record data at a convenient time after the vehicle has been returned.

The RAM 92 (FIG. 4) preferably is non-volatile so that it retains data stored in it even after the ignition switch is turned off and the relay 74 has opened. The RAM can be battery-backed, using the same battery 98 as the clock circuit 96, or it can be a static RAM or other type of non-volatile memory. Data is stored in the memory 92 until it is downloaded for use in customer billing. The data is retained in RAM after downloading until the telephone is rented again.

The battery 98 keeps the clock circuit operative at all times, thus ensuring that the computer has at hand a reliable indication of the correct date and time of day, and allows servicing of the telephone unit without loss of this facility.

Referring again to FIG. 2, a jack is provided at 84 to connect a telefax machine or a modem to the telephone device to send or receive a fax, or to send or receive data through the modem.

Also, an output cable 86 is provided to which a hand-held printer 89 or other data collective device can be connected to provide a print-out of the data stored in the computer, as it will be described in greater detail below. Preferably, the software requires the use of an access code as protection against unauthorized access. In addition, the cable 86 has a receptacle which is non-standard so that it will accept only a special plug used by the rental company so as to prevent customers from reading out the data and avoiding payment of the telephone charges.

The telephone equipment comprising the device 62 is quite compact. The telephone handset can be mounted, for example, on a goose-neck flexible arm anchored to one of the seat -mounting bolts for the front seat of a car or truck. The remaining electronic equipment will fit neatly behind the dashboard, in the space and with the straps and other fasteners often used to locate stereo equipment. Thus, there is no need to cut holes in or otherwise mutilate the vehicle to mount the telephone device. Furthermore, when the vehicle is sold or otherwise disposed of, the telephone device can be removed easily and remounted in another vehicle.

REMOTE CONTROL

There are several different ways in which the terminals 14, 16 or 18 (FIG. 1) at the vehicle rental station 10 can remotely enable, disable, interrogate and otherwise control the telephones in the vehicles. One method, referred to briefly above, is to provide a stand-alone personal or other small computer 18 with its own screen 24, keyboard 30, disk drive 36, and modem 48, connected to a dedicated printer 42 to print telephone rental data on separate forms provided for that purpose.

Instead of using a dedicated printer, the printer 38 used for preparing vehicle rental documents also could be used to prepare telephone rental documents except that it might be inconvenient to change the paper.

The use of the stand-alone terminal 18 is preferred where it is not practical to use one of the other approaches described below.

The approach which minimizes the amount of extra hardware needed is to reprogram the programs used with the normal vehicle rental terminals 14 and 16. Thus, separate lines for telephone rental information can be provided on the normal vehicle rental forms, and the rental of the telephones can be accomplished with a few extra key-strokes.

A third method of implementing the invention for vehicle rental is to store the program information needed for telephone rental and control on disk, in either disc file 32 or file server 34. Then, when it is desired to rent or control a telephone, the program routine stored on disc can be accessed and utilized in performing the various computer routines needed.

Another approach for doing the same thing is illustrated in FIG. 2. If the computer terminal 14 or 16 is provided with sufficient expansion slots, a separate microprocessor-based computer can be mounted on one or more expansion cards 64 which are inserted into the expansion slots of the computer. Then, the card can be accessed by one or more key strokes of the keyboard, in the same manner that other expansion cards are accessed in personal computers. By providing a separate microcomputer for rental control of the mobile telephones, additional memory capacity is added to the computer, and the rental and control functions can be performed faster.

LARGE SYSTEM

Figure 3:
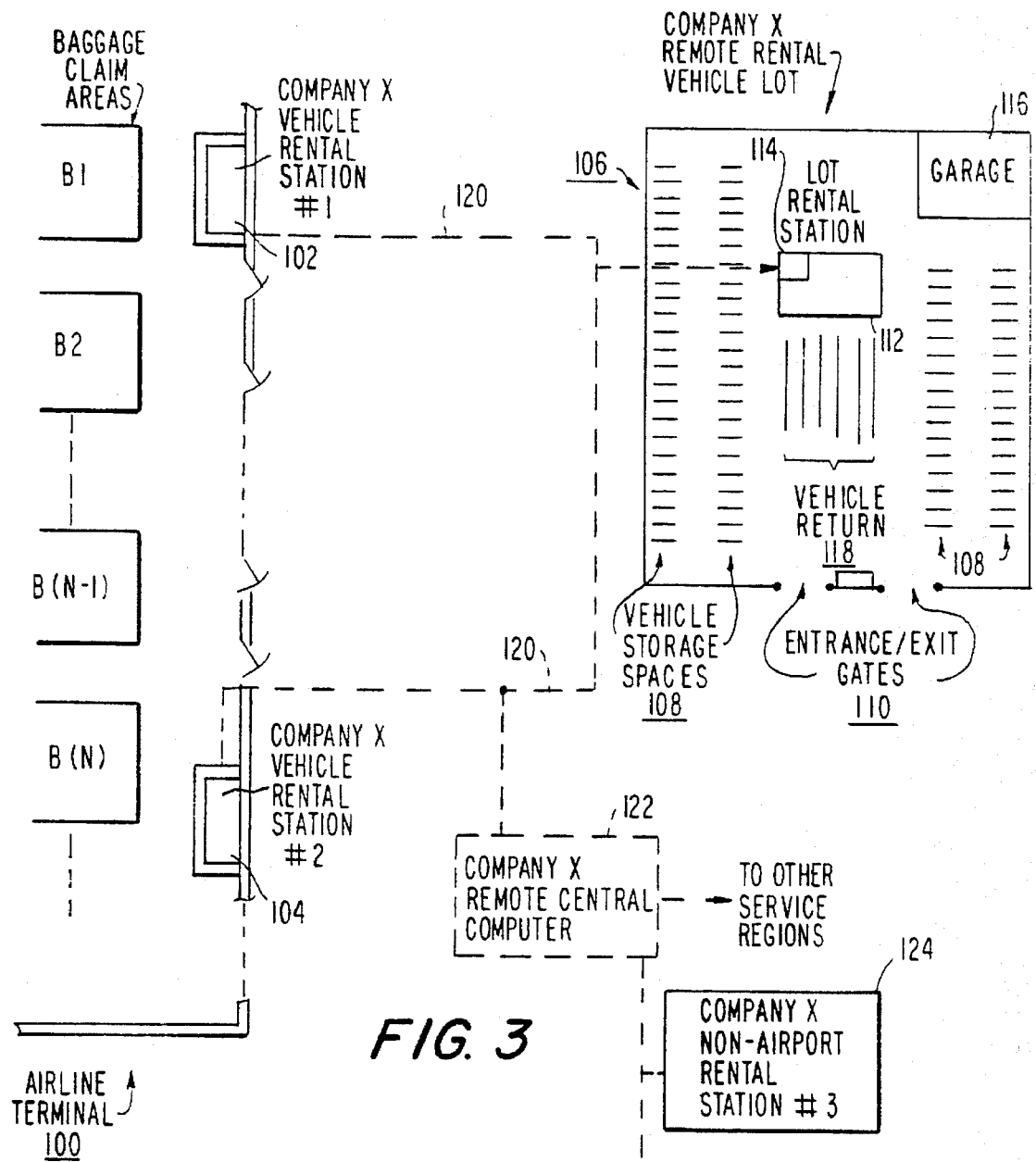
FIG. 3 is a plan view showing a larger vehicle and telephone rental system in its further details constructed in accordance with the present invention.

FIG. 3 is a schematic diagram of a large vehicle rental system constructed in accordance with the present invention. It is merely one example of one of many different configurations in which the invention can be used.

FIG. 3 shows a portion of a typical airline terminal 100 in the upper left-hand portion. The airline terminal 100 has a plurality of baggage claim areas B1, B2, etc. Located near the baggage claim areas are the vehicle rental stations 102 and 104 of a particular vehicle rental company called "Company X" in this example. If the airline terminal is a small terminal, there might only be one of the rental stations, and the vehicles may be in a nearby parking lot. However, if the airline terminal is relatively large, there often will be multiple rental stations as shown in FIG. 3, and a remote rental vehicle lot 106 which is shown in the upper right hand portion of FIG. 3. The remote vehicle rental lot 106 includes vehicle return lanes 118, vehicle storage spaces 108, entrance and exit gates 110, and a garage 116 for servicing the vehicles.

The remote rental vehicle lot also includes a return building 112 with a rental station 114 having equipment like that shown in FIG. 1. Each of the stations 102 and 104 also includes an array of equipment similar to that shown in FIG. 1. Any of the rental stations 102, 104 or 114 can be used to rent vehicles and telephones remotely.

FIG. 3 shows a communications link 120 between the three stations, 102, 104 and 114. Each of those stations is connected for communication with a remote central computer 122 used by Company X in its rental system. That computer is connected to other service regions, as it is indicated in FIG. 3. The link is through modems and telephone lines, or through other known means.

The vehicle rental system of Company X typically includes non-airport rental stations 124 and 126, which are located in the same service region as the airport stations, or in far-away locations. The invention also can be used at the non-airport rental stations 124 and 126, which has the same equipment as that located at the station 10 shown in FIG. 1.

One of the advantages of the invention becomes readily apparent when one realizes that vehicles often are returned at a location remote from the station where the vehicle was rented. For example, if the vehicle was rented at station No. 102, usually it is returned to the remote vehicle lot 106. The customer typically will leave the vehicle at the lot 106 and either drop the rental contract into a return receptacle in the building 112, or the customer will go to the rental station 114 in the lot 106 to have the contract filled out so that an exact bill can be carried away by the customer.

To check the telephone in, the rental company attendant merely enters some keystrokes on the keyboard, 26, 28 or 30. This automatically dials the telephone number of the mobile telephone in the vehicle which has just been returned through the modem 44, 46 or 48, and causes a coded interrogation signal to be sent to the telephone. This causes the telephone device in the car to deliver the call detail record data it has stored through the cellular phone system (FIG. 2) to the computer terminal. From that data the agent can prepare a bill to give to the customer.

Alternatively, if the customer merely drops a copy of the contract into the return receptacle, the agent can, at a convenient time, call up the vehicle telephone and retrieve the stored information from it to prepare a bill to be sent to the customer later. As noted above, the telephone device remains connected to the car battery for a certain length of time after the ignition is turned off to enable such an operation.

As it can be seen, there is no requirement that the vehicle carry an expensive printer to print-out the information computed and stored by the on-board computer. There also is no requirement that an employee travel to the telephone device and mechanically retrieve a printout for that purpose. Instead, the check-in and billing is provided promptly, with a minimum of labor cost, and with a minimum of hardware cost.

HAND-HELD PRINTER EMBODIMENT

In an alternative embodiment, which has been described briefly above, a hand-held printer 89 (FIG. 2) is used to retrieve the call data from a telephone when it is returned. The cable 86 shown in FIG. 2 preferably has a receptacle enabling the computer 70 to be connected manually to the hand-held printer. The cable is attached under the dashboard of the car by means of "VELCRO" hook and loop material.

The rental car company attendant simply removes the cable 86 from under the dashboard, plugs it into the hand-held printer, and pushes a button to download the data from the phone computer to the printer and print out the data. When a complete print-out has been obtained, the attendant dials a "reset" code in the car phone to clear the memory of the computer and ready it for another rental. The print-out then is taken to the rental terminal where it is used to prepare a bill.

Although this embodiment of the invention does not have all of the advantages of the more fully automated embodiments described above, it does have advantages over the prior device which has an integral printer and usually is locked in a box in the trunk of the car.

With this embodiment, the car phone does not need its own printer. Therefore, it can be smaller and less expensive, and there is no printer in the car to service.

Since it does not print out call detail data, the computer need not be locked in a box, and need not be stored in the trunk of the car. Instead, it can be simply mounted behind the dashboard. This further reduces cost, and avoids wasting the time of the attendant in unlocking the trunk of the car and the locked box.

For relatively small car rental agencies, and for country clubs which use the invention to provide rental phones in golf carts, or in restaurants, catering companies, small resorts, hotels or motels renting portable telephones, for example, this embodiment of the invention may be preferred because of its lower equipment costs.

PORTABLE TELEPHONE DEVICE

Although the telephone device 62 shown in FIG. 2 is mobile, it is not portable; that is, it cannot be carried by the user to a location outside of the car. In some vehicle telephone rental situations, and in other telephone rental situations, it is preferred that the telephone device be portable. Such a portable device is shown in FIG. 5.

Figure 5:
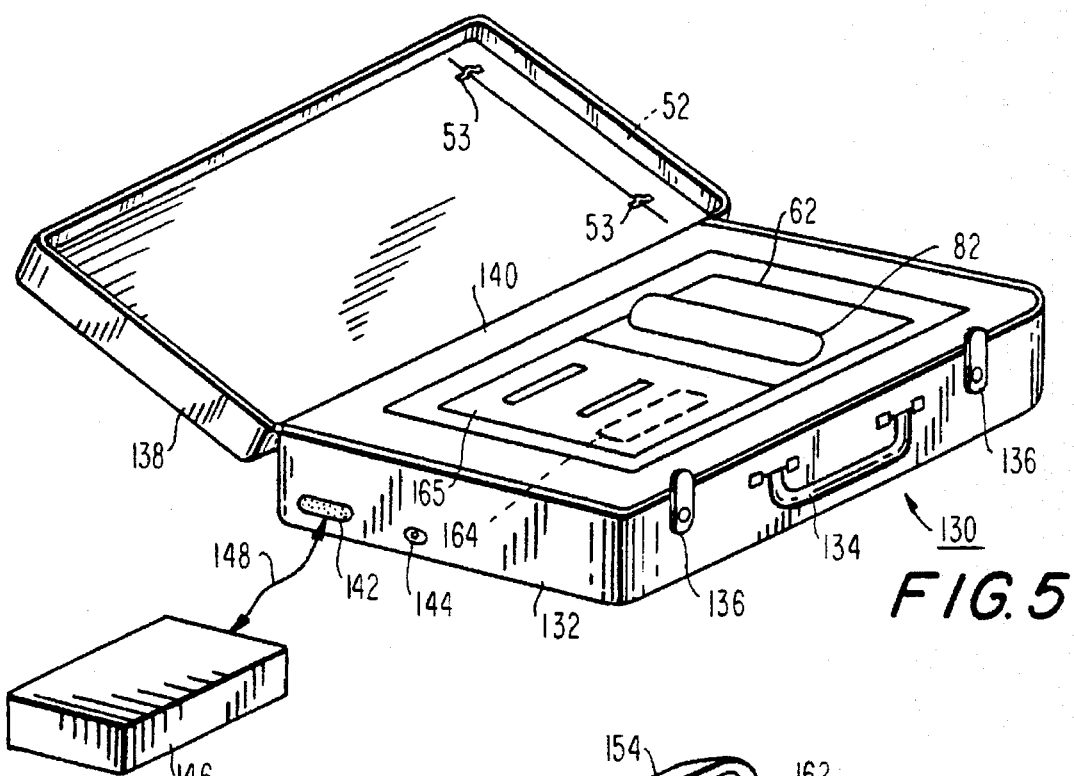
FIG. 5 is a perspective view of a mobile telephone device of the invention.

In the portable telephone device 130 shown in FIG. 5, the mobile telephone device 62 and a fax machine 165 are housed in a carrying case 132 with a hinged cover 138, a handle 134, and latches 136. A molded plastic inner chassis 140 supports and protects the equipment in the case. A cable receptacle 142 is provided to enable the connection by a cable 148 of a portable data collection device 146 or a computer terminal 152 or 154 (FIG. 6) or 14 (FIG. 1) to the telephone device to read out its call detail data. A rechargeable battery 164 is stored in the carrying case 132. The cellular transceiver antenna 52 preferably is of the type not requiring a ground plane. It is attached to the lid 138 by means of clips 53 and can be removed and mounted at a remote location to improve reception.

The portable device shown in FIG. 5 is intended to hold standard telephone or business equipment other than or in addition to the fax machine 165. For example, it can hold a lap top computer and modem, answering machine, etc. Therefore, the device constitutes a mobile business station.

It is preferable that the telephone 62 is a cordless phone enabling use of the phone with the lid 138 closed. The base antenna (not shown) for the cordless phone is mounted like the antenna 52.

HOTEL/MOTEL RENTALS

Figure 6:
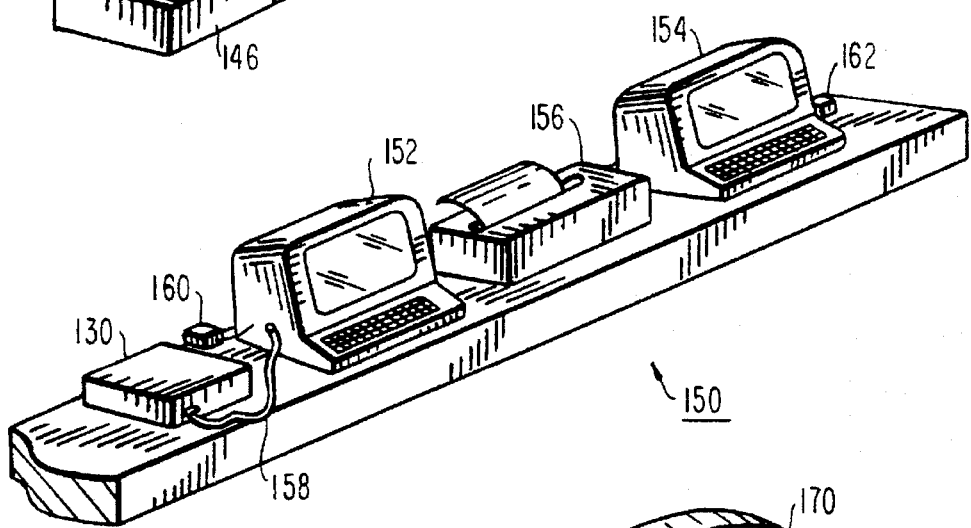
FIG. 6 is a schematic perspective view of a hotel or motel reception desk as adapted for use with the invention.

The computer terminals 152 and 154 shown in FIG. 6 are located at a hotel or motel registration desk 150. They are used to prepare bills for the guests, and for other known purposes in the hotel/motel trade. To check-in a returned rental telephone, the hotel clerk simply plugs a plug on the cable 158 into the receptacle 142 and transfers data. The computer terminals are adapted to add the charges from the mobile telephones to the hotel/motel bill for the guest.

Alternatively, the call detail records can be retrieved remotely from the telephones through modems 160 and 162 like the modems 44, 46 and 48 shown in FIG. 1 and the cellular phone system, as in the phones for rental vehicles described above. This may be desired where the phones are not returned to the registration desk.

The remote control of the portable telephones is the same as with the rental vehicle phones. That is, the computer terminals 152 and 154 are adapted to enable and disable the phones remotely, and to set time and charge limits for use of the phones. Further, the user always can call the hotel/motel registration desk or other rental station to ask for service or increase of the time and charge limits, even after those limits have been exceeded. The risk reduction which this factor brings is welcome in all telephone rentals, regardless of whether the phones are portable or mounted in vehicles.

The data collection device 146 shown in FIG. 5 can be a printer which prints out the call detail record stored in the mobile telephone device. Then, the printed record is used to prepare a bill to the customer.

Alternatively, the data collection device can be a known code reading device with memory for storing the data it receives. For example, the collection device can comprise a known optical reader wand like a bar-code reader, and memory for storing the codes. A receptacle 144 in the carrying case 132 contains a single LED which flashes in a timed sequence to deliver the coded data. If the code is a bar-code, the LED flashes so as to simulate the scanning of the wand over a series of bar codes. The optical pulses thus transmitted represent the call detail record data. The collection device 146 then can be taken into a computer terminal which extracts the stored data and prepares a bill. The data thus is transmitted optically instead of electrically. This can be advantageous in that it prevents a customer from erasing the call record data from the telephone memory by inserting the connector for his own portable printer before returning the telephone, and thus evading paying for use of the phone.

As it is indicated above, the portable mobile telephones 130 can be used by vehicle rental companies to some advantage in some circumstances. Although it is preferred to equip a substantial number of vehicles with mobile phones which are securely mounted in the vehicles, thus avoiding handling the phones during check-out and check-in, the customer may wish to rent a phone which he or she can use in the car, and also can easily carry to another location for use outside the car. Furthermore, some vehicle rental firms may not have the capital necessary to spend on a large number of phones for fixed installation in automobiles. In those cases, the portable units can be preferred.

If portable units are rented by a vehicle rental company, the cable 40 shown in FIG. 1 and attached to a computer terminal is used at the rental station to retrieve data from the phones when they are returned. Alternatively, the data can be retrieved remotely, if preferred.

Figure 11:
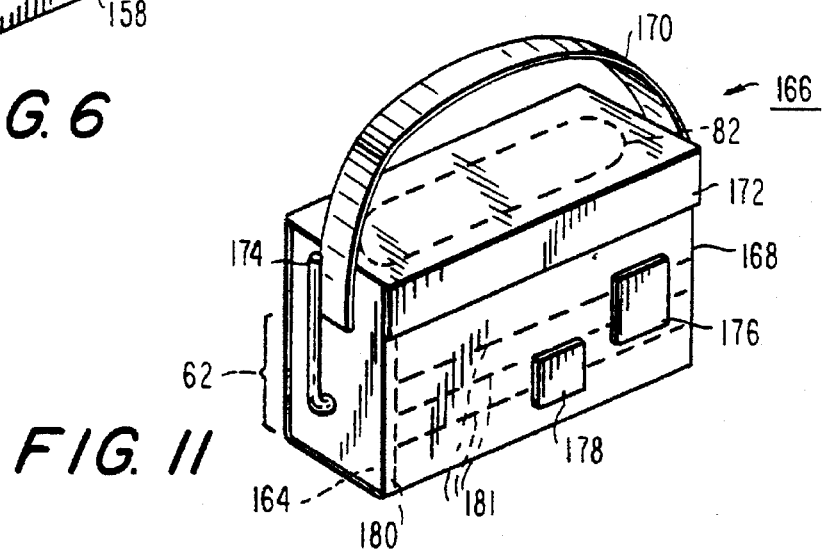
FIG. 11 is a perspective view of another embodiment of the invention.

FIG. 11 shows another portable mobile telephone device 166 of the invention. The device 166 is smaller and lighter in weight than the briefcase-sized device 130 shown in FIG. 5.

The device 166 has a case 168 made of nylon, canvas, leather, or other similar material, and a carrying strap or handle 170. A hinged top cover with a flap 172 is releasably fastened to the top edge of the case by a VELCRO hook-and-loop fastener.

The structure inside the case comprises a plastic housing with an end wall 180 and side walls with slide receptacles into which several printed circuit cards 181 slide. The printed circuit cards carry the transceiver, computer, interface and battery for the mobile telephone 62. A "rubber stick" flexible antenna 174 is mounter on the end wall 180 and extends through a hole in the case. The telephone handset 72 is just beneath the cover for the case so that it can be removed easily simply by lifting the flap 172 and opening the case.

The device 166 is very convenient for rental in hotels, motels, etc. because it is so small and light-weight. Nonetheless, it has all of the call accounting and limiting features described above and below, plus the ability to use an ordinary telephone with an ordinary dial tone.

OPERATION

The operation of mobile telephone device system shown in FIGS. 1 through 4 in a automobile rental system now will be described, assuming that a stand-alone computer 18 (FIG. 1) is used. If the rental car computer system is re-programmed to integrate telephone rentals with car rentals, the operation will be simplified considerably. The first step is initialization.

INITIALIZATION

Initially, certain data bases should be set up in the rental computer system.

One data base contains vehicle registration and identification ("VIN") numbers. Each VIN file contains the following data, in addition to the registration and identification numbers of each vehicle: the class of each car; the cellular phone number for the phone in the car; the activation code for the phone in that car; the valet lock code to be used by the customer for the valet lock feature; and a modem data link security code to be used to enable the secure transmission of data to and from the telephone by modem.

Another table which should be set up is for default values for variables of the rental systems. The dollars per day ("DPD") default table contains pre-determined default values for the limits for each day of rental, by car class. These values are used automatically when the customer does not request a specific dollar limit and no limit is set by the rental attendant. For example, for an "F" class, full-size four-door car, the default limit might be set at $15.00 per day. Therefore, for a one week rental, the attendant would contact the customer's credit car issuer and obtain authorization for a total of $105.00 in credit before the telephone is rented. If the customer does not have sufficient remaining credit, then a different limit would have to be set.

Another default table should be set up for the default value for the number of extra hours ("EXH") that a rental phone can be kept without charge. After this specific number of hours, an additional rental fee is charged. For example, if the telephone is to be returned at a particular time, and the extra hours default table allows three extra hours, if the customer keeps the car for three extra hours, there will be no additional charge for rental of the telephone. After that, an extra charge will be applied.

After initialization, there are three operational modes:

1. Check-Out/Set-Up;
2. Call Accounting/Update; and
3. Check-In/Shutdown.

These three modes now will be described, with reference to the program flow charts in FIGS. 7 and 8, and the screen displays reproduced below.

CHECK-OUT/SET-UP

This mode is used when the rental contract first is opened. Once the system computer is powered up at the beginning of the business day, the main menu of the check-out/set-up mode will appear on the screen on one of the terminals 14, 16 or 18. Following is a simulation of the main menu:

MEGATREND TELECOMMUNICATIONS

PHONE RENTAL BILLING SYSTEM

MAIN MENU▶

Update

Check-In

Move arrow to selection - press ENTER

The arrow indicates the position of the cursor, which indicates that the check-out mode has been selected. The default position of the cursor is at check-out mode.

Upon selecting the check-out mode, a new file is created (See FIG. 7) and display messages and prompts instruct the terminal operator as to the steps to take in checking out the telephone. The first screen which appears is shown below:

SCREEN NO. 1

Enter Ran: ▭ (press ENTER to accept)

Is RAN correct? (Press Y or N)

The first screen asks for the Rental Agreement Number ("RAN") by causing the lines forming the rectangular box next to the words "ENTER RAN:" to blink. The blinking stops when the first digit of the RAN is entered, and the box disappears when the ENTER key is pressed to accept the number. The RAN number is on the car rental contract previously filled out for the customer.

The program then requests the entry of a "Y" or "N" to indicate whether the RAN is correct. If "N" is entered, the first step is repeated. If "Y" is entered, the newly opened file is named with this RAN and the program moves on the next step of the program (see FIG. 7) and the next screen, Screen 2:

SCREEN NO. 2

ENTER VIN: ▭ (Press ENTER to accept)

Is VIN correct? (Press Y or N)

The next screen which appears requests the vehicle registration or identification number ("VIN"). The "blinking box" routine described above is used again, as with all data entry boxes in other screens. Once the VIN has been correctly entered, it is stored in the file with other associated data called up from the data base and default tables. This data consists of the class of the vehicle, cellular phone number, activation code, valet lock code and default values. Screen 3 appears next:

SCREEN NO. 3

Enter Rental Return Date ▭ (Press ENTER to accept)

Is RRD correct? (Press Y or N) There is no need to enter the time of rental because that time is entered, by means of the internal clock of the on-board computer, when the phone is activated to check it out. That time of day is the same as the time of day when the car is rented.

Figure 7:
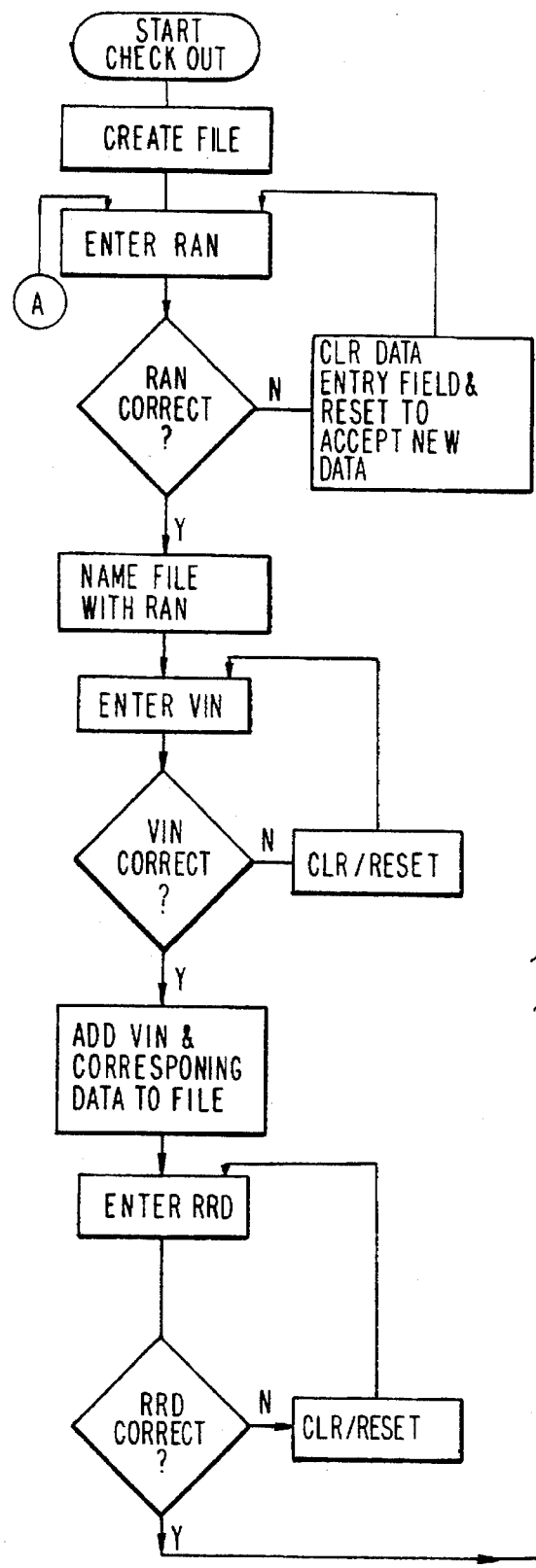
Figure 8:
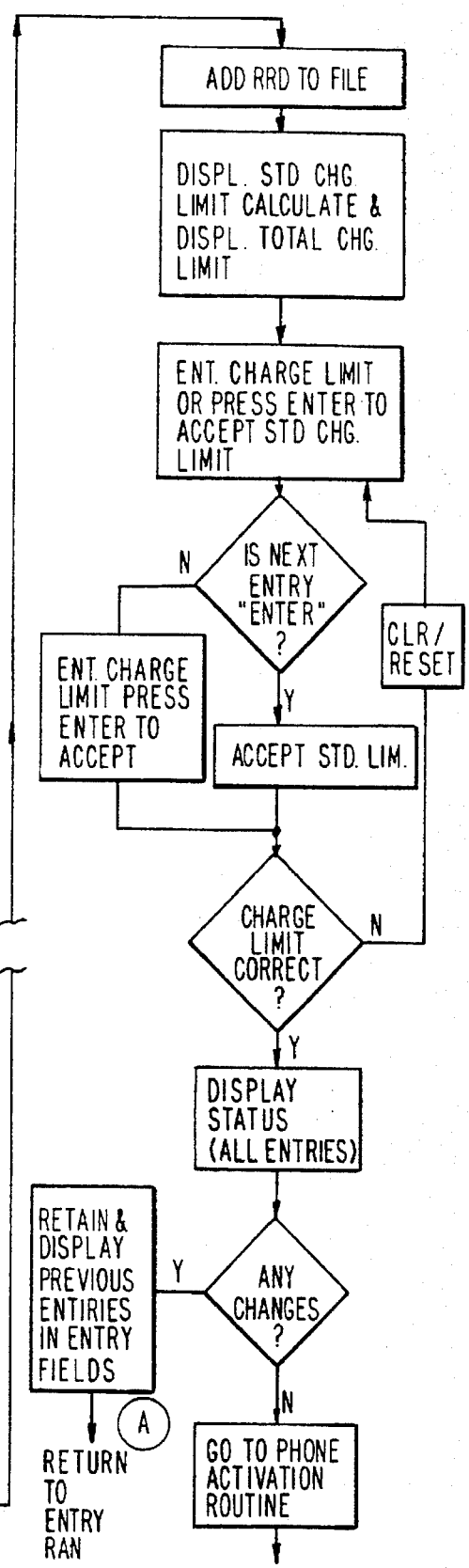

Still referring to FIG. 7, Screen No. 3 asks for the rental return date ("RRD"). This data is added to the file and used for calculating the required credit approval, and it is the date on which the rental telephone will be automatically disabled, unless the rental is extended by the rental company. Screen 4 next appears:

SCREEN NO. 4

Enter Charge Limit or press ENTER to select standard limit:

Standard Limit: $XX.XX per day - $YYYYY.YY for rental

▭ (Press ENTER to accept)

Is Charge Limit correct? (Press Y or N)

Screen, No. 4 asks for the Charge Limit; the maximum dollar amount of charges that can be incurred for use of the telephone.

There are two ways of establishing the limit. The first is with the pre-programmed default values. These default values are determined based on prior rental data as to the type of customers which rent each class of car, and an expected per-day usage allowance can be associated with each car class. The computer accesses this allowance, multiplies it by the number of days of the rental, and calculates and displays the total charge limit.

The second method of establishing the charge limit is by inputting it manually by operation of the keyboard. Thus, limits permitting heavier usage than the default values can be entered. Credit card authorization for the total is obtained by the operator so that there is strong assurance that the bill for the telephone rental will be paid. If the customer's credit card does not have sufficient credit to cover the total charge limit, then the limit is lowered or the rental is refused.

SCREEN NO. 5

Review Entries: RAN⊏⊐

VIN⊏⊐

RRD⊏⊐

Charge Limit $⊏⊐

Any Changes? (Press Y or N)

Next, after the charge limit has been set, Screen No. 5 appears. This screen allows all inputted data to be reviewed and corrected, if necessary. If changes are necessary, the program loops back to the first step (RAN input; see FIGS. 7 and 8), retains previously-entered data in the data entry field for easy reference, and accepts any changes.

When changes are completed, or if no changes are required, the system computer prints out a contract for the phone rental that the renter signs. Preferably, this is a pre-printed form bearing the terms and conditions of the rental, and the computer need only fill out the particulars of the rental, such as start and return dates; RAN; vehicle data; cellular phone number; emergency telephone numbers for towing, etc.; number to call to raise the usage limit or to extend the time of usage; valet lock code; and a list of ongoing promotions. The promotions, for example, can consist of telephone numbers which can be called free by the rental car customer to make reservations or receive messages from sponsoring restaurants or other businesses who are paying the rental company a promotional fee, or civic or charitable events which the company wishes to promote.

By entering "N" during Screen No. 5, the phone activation screen (not shown) appears and asks the operator to press one of the keyboard function keys. When this is done, the computer looks up the phone number for the car phone, and dials the phone through a modem. Either the car telephone will answer and the phone system will be activated, or the phone will not answer because the relay 74 has opened. In the latter case the phone system will be activated by the renter upon starting the car.

When the telephone is still connected to the car battery 76, the computer will send a security code to the on-board computer which, upon receipt, will open a data link. Once the data link has been established, the system computer will send the activation code. This will turn on the mobile telephone system. Next, the customer and vehicle parameters such as the rental agreement number, rental return date, the call charge limit, and vehicle identification number are downloaded into the on-board computer in the mobile telephone. The system computer then re-sends the security code and this closes the data link and terminates the call. The mobile telephone device is now ready for use.

Activation of the telephone after the connection of the telephone to the car battery has been broken proceeds in a different way. When the computer places a call to the car phone, the phone will not answer. The customer still is given a telephone rental contract as if the phone had been activated but the customer will have to place a call from the car to actually activate the telephone.

The activation procedure in the latter case is as follows. When the customer gets to the car in the rental lot, he or she starts the car. This connects the phone system to the car battery, due to closing of the ignition switch 78 (FIG. 2). The customer then enters a command into the telephone hand-set which initiates a series of steps which will activate the telephone. First, the on-board computer 70 will dial up the system computer through its own modem. It will send the proper security code to establish a data link with the rental station computer. The rental station computer will look through its files to determine whether or not the calling number is due to be activated. If so, the phone will be activated by the procedure described above.

CALL ACCOUNTING/UP-DATE

During the rental, the on-board computer 70 calculates the rental charges, and stores the charges and other call detail data in RAM. It adds the charges together to produce a sum total. Updating, consisting of changing limits or other adjustable parameters, will be described below.

LIMIT ENFORCEMENT

The enforcement of the charge limits and time limits preferably is accomplished by the on-board computer 70 in the mobile telephone device 62 with the aid of the internal electronic clock 96 (FIG. 4) which is connected to the battery 98 at all times. The clock 96 keeps the time of day and the date.

The computer 70 is programmed to perform an enforcement routine every time the telephone is picked up to be used for receiving or sending a call, except for free calls. The Limit Check enforcement routine, shown in FIG. 9 of the drawings, causes the computer 70 to compare the current date and time of day with the pre-set time limit, and disables the telephone for all incoming and outgoing calls, except emergency and free calls, when:

$$A=T+Q,$$

where A is the current time and date, T is the pre-set time limit, and Q is the overtime use permitted by the rental company. When the phone is disabled, the display 85 (FIG. 2) is lighted to warn the user.

If the time limit has not expired, the time remaining is displayed in the display space 85.

If the time limit has not been reached, the program causes the computer 70 to compare the total charges accumulated for the use of the telephone by the current customer with the pre-determined charge limit. When the total charges Y are found to have reached or exceeded the value of:

$$Y=X-M$$

Where X is the charge limit, and M is the minimum charge for an incoming or outgoing call, the computer 70 disables the telephone device from sending or receiving any calls except free calls or emergency calls and lights the display 87 (FIG. 2). The disabling action occurs when Y is less than X because otherwise the authorized amount (Y) would be exceeded by the next call.

If the charge limit has not been reached, the credit remaining is displayed at 87.

It should be understood that the display of time or credit remaining is an optional feature.

It also is an optional feature of the invention to repeat the Limit Check routine periodically during each phone call and selectively disable the phone if either limit is reached during the call. Since this can create considerable customer displeasure, some telephone lessors may prefer to take the risk involved in allowing the completion of a call, even after a limit has been reached.

In FIG. 9, the dashed "RETURN" line indicates such optional repetition of the Limit Check routine. The repetition preferably is at a rate which is a function of the time duration of the call; e.g., once every minute, or once every five minutes.

If desired, a warning can be given to the user that he or she is within a certain length of time of reaching the time limit, or is within a certain amount of reaching the charge limit. This can be done by causing the display 85 and/or 87 (FIG. 2) to flash periodically. If this warning is given, the enforcement of the limits during calls can be done with less customer displeasure because the customer often can tailor the call to fit the time or credit available, if given such a warning.

If the flashing warning light feature is used, either with or without limit enforcement during calls, the added cost of displaying the amounts of the time or credit remaining can be avoided, because the flashing light often will be adequate.

The flashing warning light feature is shown in dashed outline in the flow chart of FIG. 9.

Rather than using flashing or steady lights to advise the use regarding the approach to or arrival at one of the limits, it often will be preferable to develop an audible signal. This avoids the need for an automobile driver to turn his or her eyes away from the road and reduces manufacturing and installation costs.

The computer 70 can be programmed to sound a "beep" tone once every minute during the warning period, and a rapidly-repeated "beep" tone after the limit has been reached. Alternatively, a voice-message generator chip can be used to deliver a message such as "you have only five more minutes of time left", or "you have only twenty dollars more credit left." "Please call your rental station to revise your limit."

If an on-going call is to be interrupted, the periodic "beep" warning is preferred over the recorded voice message, so as to avoid seriously interfering with the call.

The mobile telephone device 62 has the ability to be re-programmed remotely during a rental to increase or decrease the time and/or charge limits.

CHANGING LIMITS

The customer can tell that the time and/or charge limit has been reached because one or both of the lamps 83 and 87 is lighted or an audio message is given.

If the customer decides that he or she wishes to keep the car longer than originally authorized, or to use the telephone beyond the original charge limit, the customer merely makes a call to the rental station and requests the increase desired. This call is one of the calls still permitted even when the time or charge limit has been reached. It is preferred that this and other calls so permitted be free.

New charge and/or time limits are set in accordance with the check-out/set-up procedures described above. That is, new credit card authorization is obtained by phone for the new time limits and/or phone rental charge limits. Then, the system computer sends a security code to establish a data link between the telephone and the computer, and sends the new limits to the phone's computer. The phone then is enabled until the new limits have been exhausted.

The same procedure can be used to reduce the time and charge limits if necessary; for example, the charge limit can be reduced if an error was made in obtaining authorization of the charge limit amount.

CHECK-IN/SHUT-DOWN

FIG. 10 shows the steps used in checking the phone in, printing a bill, and shutting the phone down upon its return. A data link is formed between the phone and one of the computer terminals, either by phone or by cable, or by way of a portable data gathering device. The contents of the memory of the phone computer 70 are read-out and displayed on the computer screen. If the display is o.k., the operator pushes an appropriate function key to print the bill, and to disable the telephone. The data in the phone memory is cleared during the phone activation routine when the phone is rented again.

INCOMING CALL CONTROL

In rental telephones, the problem arises that unwanted calls directed to a prior user of the phone may be received by the current renter. This can arise because the prior user gave the telephone number to people to call him, and failed to tell them when he would return the phone, or returned it sooner than expected. Not only is this a nuisance to the current renter, but it adds charges to his bill because incoming calls are charged for, as well as outgoing calls.

In accordance with a further feature of the invention, the foregoing problem is alleviated by adding a specific number for each phone when it is rented out, and changing that number with each successive rental of the same phone. Then, when callers dial the prior number of the phone, the call will not be accepted because the phone then will have a new number.

This feature is implemented by programming the on-board computer 70 to answer each incoming call, but delay ringing the mobile telephone until a certain length of time has passed. If a tone signal representing the correct added digit is received within the delay time, then the computer causes the mobile phone to ring. If not, then the phone does not ring, and the call is disconnected.

Preferably, the computer is programmed to index the extra number automatically upon each down-loading of data or similar event signifying a new rental.

This optional feature can be enabled or disabled by the rental agent, or manually changed, if desired. It also can be changed remotely, in the same way that limits can be changed, as described above. In this way, renters' preferences can be accommodated.

AUTOMATIC CREDIT FOR DROPPED CALLS

Another problem with mobile telephones is that the calls can be "dropped" or interrupted by local interference or other causes. Normally, part of a minute of "air time" is charged for by the mobile phone system as if it were a full minute.

In some cellular phone systems, a time delay is provided (e.g., 10 seconds) between the time when the connection is broken and when the connection is dropped, so that if the user presses the "SEND" button on his phone, the company will give him credit for the last minute of the call. Then, the user must dial the call again.

The preferred telephone of the present invention does not have a "SEND" button. However, credit is given for the last minute of a dropped call by use of the answer detect circuit 97 (FIG. 4) to detect the hang-up of the called party, and using that detection to identify a completed call and differentiate it from a dropped call. When the hang-up signal is not detected, credit is given to the user for the last minute of the dropped call. Also, the computer 70 is programmed to develop a "SEND" signal and send it to the cellular system so that the lessor of the telephone (e.g., the hotel or car rental company) also gets credit for the last minute of the dropped call.

The answer detect circuit 97 is well-known, and in view of the disclosure above, the programming steps to implement the incoming call control and dropped call credit features are well within the skill of the art to provide.

VALET LOCK

The mobile telephone of the invention preferably has a "valet lock" feature, in which the renter can simply press a series of push buttons on the telephone key pad 82 (FIG. 2) and at least partially disable the telephone, and later repeat the procedure to enable the phone again. This is useful, for example, when the car in which the phone is installed is turned over to a valet for parking, or is loaned to someone who should not be allowed to use the telephone. The problem also can exist with portable phones such as those shown in FIGS. 5 and 11 when the renter wishes to leave the phone in a hotel room, car or other place where unauthorized personnel might be tempted to use the phone and generate substantial usage charges.

In prior mobile telephones, the transceiver 66 (FIG. 2) has a "lock" feature which can be activated by dialing certain numbers on the key pad 82, thus disabling the transceiver entirely. Unfortunately, some interface devices, when used with the transceiver, do not allow this type of operation. Moreover, the inventors have recognized that it would constitute a substantial improvement to only partially disable the phone and continue to allow its use at least for emergency calls, such as calls to the 911 number.

Accordingly, in the present invention, the on-board computer 70 is programmed to disable the telephone only for making and receiving calls other than emergency calls, and, optionally, free calls e.g., to the rental station, for promotions, etc. and data lines for example. The computer 70 is programmed to recognize the dialing of the valet code to partially disable the phone, and to recognize the later dialing of the same code to re-enable the phone.

Preferably, a separate, unique valet code can be set for each phone, and need not be displayed on the phone. This eliminates a further problem with some prior devices in which each phone uses the last four digits of the phone number as a lock code. Since the phone number appears on the phone, unscrupulous people are allowed to defeat the lock simply by reading the numbers on the phone, and dialing them.

This feature also has other advantages. For example, even though the customer has used the valet lock and does not unlock the phone before returning the car, if a data line remains enabled, the operator at the rental terminal can interrogate the computer 70 and download its contents without unlocking it.

HARDWARE

The hardware components of the system are conventional and readily available on the open market.

The interface device 68 shown in FIG. 2 is readily available. For example, a suitable device is sold by Telular Inc. of Wilmette, Ill. Other such devices are available from Motorola and others.

The transceiver 66 also is conventional and suitable devices are sold by several companies, e.g. Motorola. The telephone hand-set 72 also is conventional and readily available.

A suitable hand-held printer capable of use in downloading and printing rental data from the on-board computer 70 is, for example, a Seiko Model DPU-40 thermal dotmatrix printer, made by Seiko Instruments, U.S.A. The modems, computer terminals and printers all are standard equipment.

The answer detection device 97 (FIG. 2) also is known. A suitable device is made, for example, by Subcon Mfg. Inc., Algonquin, Ill.

It can be seen from the foregoing that the invention amply satisfies the objectives set forth above.

The foregoing is not to be considered to be an exhaustive description of the invention. The invention can be practiced in various ways, including some not specifically described above, and still use the heart and spirit of the invention set forth in the claims.

We claim:

1. A mobile telephone device, said device comprising, in combination, mobile transceiver means for making and receiving telephone calls, registering means for registering data representing a rental time limit, detecting means for detecting when said rental time limit has been reached, and indicating means responsive to said detecting means for developing limit-indicating signals indicating when said time limit has been reached.

2. A mobile telephone device as in claim 1 including means for registering a usage charge limit, and indicating means for indicating when said charge limit has been reached.

3. A mobile telephone device as in claim 1 including means for developing said limit-indicating signals, said developing means being selected from a group consisting of (a) an on-board computer having storage means, and (b) means for receiving a coded signal from a remote station.

4. A mobile telephone device as in claim 1 including means responsive to adjustment signals for adjusting said limit.

5. A mobile telephone device as in claim 1 including means responsive to remote signals for registering said time limit, and for enabling said telephone device.

6. A mobile telephone as in claim 1 including indicator means for indicating to the user of said telephone device when the time of use of said device reaches a value within a pre-determined range of values above or below said limit.

7. A mobile telephone device for rental vehicles, said telephone device comprising, in combination, a mobile telephone transceiver mounted in said vehicle, storage means mounted in said vehicle and connected to said transceiver for storing signals representing telephone usage data for said telephone device, and read-out means in said device and responsive to a read-out signal for delivering electrical data signals corresponding to said data from said storage means for utilization at a utilization station, and timing means for substantially disabling said telephone device after a predetermined rental time.

8. A mobile telephone device, said device comprising, in combination, a mobile transceiver device for making and receiving telephone calls;

a storage device for storing data representing a plurality of charge rates and limit data representing a usage charge limit;

a computer for selectively using said charge rates to compute usage charges for each telephone call transmitted or received by said telephone device;

a detector for detecting when said usage charge limit has been reached and producing a corresponding detector signal;

an indicator responsive to said detector signal for developing limit-indicating signals indicating when said charge limit has been reached, and means for changing said plurality of charge rates to a new plurality of charge rates.

9. A mobile telephone device as in claim 8 including an indicator for indicating to the user of said telephone device when said usage charge reaches a value within a predetermined range of values above or below said limit.

10. A mobile telephone device as in claim 8 including means responsive to adjustment signals for adjusting said limit.

11. A mobile telephone device as in claim 8 including means responsive to remote signals for registering said limit, and for enabling said telephone device.

12. A mobile telephone device as in claim 8 in which said device is a cellular telephone device.

13. A mobile telephone device as in claim 8 including a display for indicating said usage charges for a telephone call while it is in progress.

14. A mobile telephone device as in claim 13 in which said display indicates the unused portion of said usage charge limit.

15. A mobile telephone device, said device comprising, in combination:

a transceiver for sending and receiving telephone calls from a mobile location;

a data storage device for storing electrical signals representing a plurality of charge rates for telephone calls and usage charges for the use of said device for a plurality of calls over a period of time;

an on-board computer for using a charge rate selected from those stored in said storage means to compute usage charges for each of said telephone calls and storing signals representing said usage charges;

means for changing said plurality of charge rates to a new plurality of charge rates;

and means for transferring the signals representing usage charges to a data transfer device in response to connection of the data transfer device to said telephone device.

16. A mobile telephone device as in claim 15 in which said data transfer device is selected from the group consisting of a hand-held printer; an elongated conductor; and an optical read-out device.

17. A mobile telephone device for rental vehicles, said telephone device comprising, in combination;

a mobile telephone transceiver mounted in said vehicle;

an electronic computer, and a data storage device mounted in said vehicle and connected to said transceiver for storing signals representing call charges, a plurality of different charge rates for different telephone calls, and a limit for the total of said call charges;

a computer mounted in said vehicle for applying said charge rates selectively to calls made by use of said device to compute said call charges and their total, and for storing signals in said storage means representing said total;

indicating means for indicating when said call charge total reaches said limit;

means for changing said plurality of charge rates to a new plurality of charge rates;

and a read-out device responsive to a read-out signal for delivering electrical data signals corresponding to said call charges from said storage means for utilization at a utilization station.

18. A mobile telephone rental system, said system comprising: at least one mobile telephone device, at a rental station, said telephone device including;

a transceiver means for making and receiving telephone calls;

storage means for storing data representing a plurality of call charge rates and call detail record data;

an on-board computer for using selected ones of said charge rates, and computing the usage charges for each telephone call made or received by said device during its rental;

a read-out device for reading out said call detail record information and said usage charges in response to the receipt of a coded interrogation signal;

means for changing the plurality of call charge rates to a new plurality of call charge rates;

and a control device at said rental station, said control device including a retrieval device for sending said coded interrogation signal to said telephone device and retrieving said call detail record information signals.

19. A method of renting a mobile telephone device, said method comprising the steps of:

(a) providing at a rental station a mobile telephone device with an on-board computer and an electronic registering device for registering data, said registering device containing charge rate data representing a plurality of different charge rates for a plurality of different telephone calls which can be made during the rental of said device, and charge limit data defining a total charge limit for usage charges for the use of said device said data storage device being adapted to store new charge rates upon the input of new charge rate data;

(b) renting said telephone device;

(c) retrieving said charge rate data from said registering means and using said on-board computer and said charge rate data to compute usage charges for telephone calls made by the use of said telephone device;

(d) computing the total of said usage charges and detecting when said total charge limit has been reached; and (e) indicating when said charge limit has been reached; and (f) changing said charge rate data for at least one rental of said telephone device.

20. A method as in claim 19 including the step of producing a warning signal when said total of said usage charges approaches said charge limit within a predetermined range below said charge limit.

21. A method as in claim 19 including the step of retrieving said total charges from said registering device when the telephone device is returned to said rental station.

22. A method as in claim 21 in which said retrieving step comprises connecting a hand-held printer to said telephone device and causing the total charges to be printed out.

23. A method as in claim 19 including the step of displaying telephone cost information on a display during a telephone call.

* * * * *

(12) EX PARTE REEXAMINATION CERTIFICATE (4890th)
United States Patent
Wittstein et al.

(10) Number: US 5,631,947 C1
(45) Certificate Issued: Jan. 6, 2004

(54) MOBILE TELEPHONE DEVICE FOR STORING A PLURALITY OF CHANGABLE CHARGE RATES AND TIME LIMIT DATA

(75) Inventors: Alan D. Wittstein, Westport, CT (US); Giacomo A. Ciocca, Thomaston, CT (US)

(73) Assignee: Tracfone Wireless, Inc., Miami, FL (US)

Reexamination Request:
No. 90/005,909, Jan. 12, 2001

Reexamination Certificate for:
Patent No.: 5,631,947
Issued: May 20, 1997
Appl. No.: 08/373,509
Filed: Jan. 17, 1995

Related U.S. Application Data

(63) Continuation of application No. 08/235,198, filed on Apr. 29, 1994, now abandoned, which is a continuation of application No. 07/673,140, filed on Mar. 4, 1991, now abandoned.

(51) Int. Cl.[7] .......................... H04Q 7/20; H04Q 7/22; H04Q 7/24; H04M 11/00; H04M 15/00
(52) U.S. Cl. ...................... 379/114.17; 379/114.01; 455/406; 455/409
(58) Field of Search .......................... 455/406, 407, 455/408, 422, 550, 409, 557; 379/111, 114, 115, 119, 120, 156

(56) References Cited

U.S. PATENT DOCUMENTS

| | | | |
|---|---|---|---|
| 3,459,882 A | 8/1969 | Gabriel et al. | 178/5.1 |
| 3,531,586 A | 9/1970 | Bass et al. | 178/6 |
| 3,725,947 A | 4/1973 | Albertini et al. | 346/33 R |
| 3,806,922 A | 4/1974 | Isbister | 343/6.6 LC |
| 4,284,848 A | 8/1981 | Frost | 179/2 EB |
| 4,399,330 A | 8/1983 | Kuenzel | 179/2 EB |
| 4,518,824 A | 5/1985 | Mondardini | 179/6.3 |
| 4,585,904 A | 4/1986 | Mincone et al. | 179/7.1 TP |

(List continued on next page.)

FOREIGN PATENT DOCUMENTS

| | | | |
|---|---|---|---|
| EP | 0 048 868 B1 | 1/1986 | H04Q/7/04 |
| EP | 0 135 196 B1 | 8/1991 | H04Q/7/04 |
| FR | 2 535 491 | 5/1984 | G06F/15/22 |

(List continued on next page.)

OTHER PUBLICATIONS

Brown, Peter, "Payphones Get Ready for the Ball," *Telephony*, pp. 144–145 (May 23, 1988).
"Smart Payphone Goes Public," *Design News*, p. 18 (Dec. 15, 1986).
Kaihara, M. et al., "Magnetic Card Public Telephone," *Review of the Electrical Communication Laboratories*, vol. 32, No. 1, pp. 49–54 (1984).

(List continued on next page.)

*Primary Examiner*—Charles Appiah

(57) ABSTRACT

The mobile telephone is well adapted for use as a rental phone. It has an on-board computer which computes and stores telephone usage and control information such as charges for usage of the telephone. Time and charge limits can be set for the telephone. For example, the telephone can be set to disable itself for all or a selected category of incoming and outgoing calls after the passage of a pre-determined time, and/or when the total usage charges reach a pre-determined maximum. Preferably, these limits can be set and adjusted remotely. The telephone is valuable for use in rental vehicles. The telephone is adapted to deliver its stored information when called and interrogated by use of a computer at a station when the rental vehicle is returned. The telephone can be checked-out and enabled, and the time and charge limits adjusted, all from the same remote station. The telephone also is particularly valuable in other types of rentals, such as in a hotel or motel where the mobile telephone is housed in a portable briefcase or carrying case. The time and charge limits are enforced automatically, and can be changed remotely, as with other versions of the telephone device. Features also are provided to block unwanted calls intended for a prior renter of the phone; to give charge credits for "dropped calls"; and for selectively locking the phone to prevent unauthorized use for all but emergency calls, data transmission and similar calls.

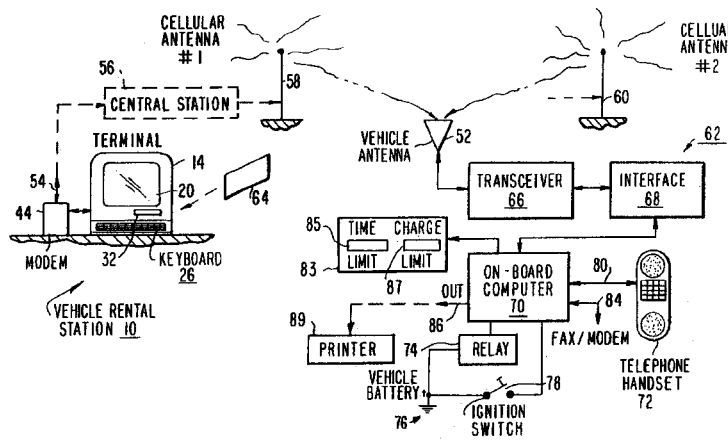

U.S. PATENT DOCUMENTS

| | | | |
|---|---|---|---|
| 4,635,285 A | 1/1987 | Coombes | 379/63 |
| 4,706,275 A | 11/1987 | Kamil | 379/144 |
| 4,839,829 A | 6/1989 | Freedman | 364/519 |
| 4,843,385 A | 6/1989 | Borras | 340/825 |
| 4,916,621 A | 4/1990 | Bean et al. | 364/436 |
| 4,958,368 A | 9/1990 | Parker | 379/91 |
| 5,020,091 A | 5/1991 | Krolopp et al. | 379/58 |
| 5,086,510 A | 2/1992 | Guenther et al. | 455/90 |
| 5,148,472 A | 9/1992 | Freese et al. | 379/59 |
| 5,220,593 A | 6/1993 | Zicker et al. | 379/59 |
| 5,233,656 A | 8/1993 | Langrand et al. | 380/23 |
| 5,252,815 A | 10/1993 | Pernet | 235/441 |
| 5,276,729 A | 1/1994 | Higuchi et al. | 379/58 |
| 5,301,223 A | 4/1994 | Amadon et al. | 379/58 |
| 5,301,234 A | 4/1994 | Mazziotto et al. | 380/23 |
| 5,303,285 A | 4/1994 | Kerihuel et al. | 379/58 |
| 5,631,947 A | 5/1997 | Wittstein et al. | 379/59 |
| 5,673,306 A | 9/1997 | Amadon et al. | 379/59 |

FOREIGN PATENT DOCUMENTS

| | | | | |
|---|---|---|---|---|
| FR | 2 548 808 | | 1/1985 | G07F/17/00 |
| GB | 2 046 556 A | | 11/1980 | H04M/15/28 |
| GB | 2 211 050 A | | 6/1989 | |
| GB | 2 215 559 A | | 9/1989 | H04Q/7/04 |
| GB | 2 225 689 A | | 6/1990 | H04Q/7/04 |
| GB | 2 249 920 A | | 5/1992 | H04M/15/30 |
| JP | 02244964 A | | 9/1980 | H04M/15/00 |
| JP | 63014563 A | | 1/1981 | H04M/15/00 |
| JP | 60035868 A | | 3/1985 | H04M/15/00 |
| JP | 62015961 A | | 1/1987 | H04M/15/02 |
| JP | 62-278870 A | | 3/1987 | H04M/15/00 |
| JP | 62277842 A | | 12/1987 | H04M/15/00 |
| JP | 63299455 A | | 12/1988 | H04M/17/02 |
| JP | 2086339 A | | 3/1990 | H04B/7/26 |
| JP | 2238734 A | | 9/1990 | H04B/7/26 |
| JP | Hei-03045031 A | | 2/1991 | H04B/7/26 |
| JP | 3060229 A | | 3/1991 | H04B/7/26 |
| JP | 03080756 A | | 4/1991 | H04M/17/00 |
| JP | 03114352 A | | 5/1991 | H04M/15/00 |
| JP | 03128563 A | | 5/1991 | H04M/15/02 |
| JP | 03280652 A | | 12/1991 | H04M/17/00 |
| WO | WO 81/02235 | | 8/1981 | H04M/15/28 |
| WO | WO 90/03077 | | 3/1990 | H04M/15/30 |

OTHER PUBLICATIONS

Meredith, P., "Payphones: A Market in Regulatory and Technological Transition," *Logica Consultancy, Ltd., UK,* pp. 421–415 (1988).

Brooks, Bernard, "The Educated Payphone," *TE&M,* pp. 63–70 (Jun. 1, 1988).

Pridgeon, Geoffrey, "The Card Phone," *Telecommunication Journal of Australia,* vol. 37, No. 2, pp. 2–8 (1987).

Arnold, P.A., "Card Operated Payphones Can Simplify Service and Security," *Telephony,* pp. 56–57 (Sep. 27, 1982).

Golden, Michael, "A Bridge to the Future," *TE&M,* pp. 5–57.

Ostendorf, Gene, "Retrofit Can Ease Phone Updates," *TE&M,* pp. 57–58 (Jun. 1, 1988).

Weis, Klaus, "Smart Card: Plastic Cards Are Becoming Intelligent," *Mobile Communication,* vol. 5, pp. 245–249 (1989).

Advertisement by Megatrend Telecommunications, Inc., "Nobody Cares More About Limousines Than Megatrend".

Advertisement by Megatrend Telecommunications, Inc., "Nobody Cares More About the Serious Boater Than Megatrend".

Adrian Morant, "Direct From Europe: New Choices in PayPhones," TE&M, Jan. 1, 1990, pp. 59–62.

John S. Vaughan, "Intelligence Makes Payphones Pay," TE&M, Mar. 15, 1987, pp. 75–59.

The Tablemate Phone, Be Among the First to Offer Your Clientele This Exciting New Service, 1988 Megatrend Communications, Inc., 2 pp.

The Automate Phone, Nobody Cares More About Limousines Than Megatrend, 1989 Megatrend Communications, Inc., 2 pp.

Payphones for Limousines, Megatrend Communications, 2 pp.

The Automate Cellular Interface (photo), Megatrend Communications, Inc., 1p.

True Mobile Telephone Communications, The Automate Cellular Interface, Megatrend Communications, 1 p.

The Firstmate Phones, Nobody Cares More About The Serious Boater Than Megatrend, Megatrend Communications, Inc., 2 pp.

Payphones for Charter Boats, Communication through the Firstmate phone . . . , Megatrend Communications, 2 pp.

True Marine Telephone Communications, The Firstmate Phones, Megatrend Communications, 1 p.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

* * * * *